(12) United States Patent
Adams et al.

(10) Patent No.: US 9,070,128 B1
(45) Date of Patent: Jun. 30, 2015

(54) METHODS, SYSTEMS, AND PRODUCTS FOR VERIFYING ACCOUNT TRANSACTIONS

(75) Inventors: Cheryl Adams, Cary, NC (US); Patricia Scardino, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 2147 days.

(21) Appl. No.: 11/437,949

(22) Filed: May 19, 2006

(51) Int. Cl.
*G06Q 20/00* (2012.01)
*G06Q 20/40* (2012.01)

(52) U.S. Cl.
CPC .................................. *G06Q 20/401* (2013.01)

(58) Field of Classification Search
USPC .......................................................... 705/75
See application file for complete search history.

(56) References Cited

U.S. PATENT DOCUMENTS

| | | | |
|---|---|---|---|
| 5,321,751 A * | 6/1994 | Ray et al. ...................... | 713/186 |
| 5,880,769 A | 3/1999 | Nemirofsky et al. | |
| 6,685,093 B2 | 2/2004 | Challa et al. | |
| 6,687,346 B1 | 2/2004 | Serbin et al. | |
| 6,736,322 B2 | 5/2004 | Gobburu et al. | |
| 6,764,011 B2 | 7/2004 | Entani | |
| 6,854,651 B2 | 2/2005 | Smith et al. | |
| 6,969,002 B2 | 11/2005 | Creamer et al. | |
| 2001/0034720 A1* | 10/2001 | Armes ............................ | 705/65 |
| 2005/0109835 A1 | 5/2005 | Jacoby et al. | |
| 2005/0203765 A1 | 9/2005 | Maritzen et al. | |
| 2005/0247797 A1 | 11/2005 | Ramachandran | |
| 2005/0252961 A1* | 11/2005 | Rasti ............................. | 235/380 |
| 2006/0081700 A1* | 4/2006 | Li ................................. | 235/380 |
| 2006/0085335 A1* | 4/2006 | Crawford et al. ............... | 705/40 |
| 2008/0205655 A1* | 8/2008 | Wilkins et al. ................. | 380/279 |

FOREIGN PATENT DOCUMENTS

EP       1480106 A1 *  11/2004   .................. G06F 1/00

* cited by examiner

*Primary Examiner* — James A Reagan
(74) *Attorney, Agent, or Firm* — Withrow & Terranova, PLLC (57) ABSTRACT

Methods, systems, and products are disclosed for verifying account transactions. A transaction request is received that seeks to pre-approve a transaction for an account number. A verification character string is also received that is currently associated with the account number. If the transaction is pre-approved, then a new verification character string is assigned to the account number, such that the verification character string is changed with each transaction request.

20 Claims, 9 Drawing Sheets

METHODS, SYSTEMS, AND PRODUCTS FOR VERIFYING ACCOUNT TRANSACTIONS

BACKGROUND

This application generally relates to data processing and, more particularly, to verifying and to pre-approving account transactions.

Credit and charge card fraud is a problem. The United States Federal Trade Commission estimates that credit/charge card fraud costs consumers and businesses hundreds of millions of dollars each year. See, e.g., FEDERAL TRADE COMMISSION, AVOIDING CREDIT AND CHARGE CARD FRAUD (1997). As online shopping grows in popularity, Internet merchants are bracing for increased fraudulent transactions. Because online transactions do not require a signature or a physical card, payment fraud is a continual concern for e-commerce merchants. The Nilson Report (a trade publication for consumer payment systems), for example, estimates that credit card fraud accounts for eighteen to twenty four cents ($0.18-$0.24) of every $100 of online sales.

Because fraud is a problem, merchants and financial institutions are striving to reduce fraud. Some merchants adopted elaborate procedures for completing a sale, such as matching a shipping address to a billing address, verifying that a card has not been reported lost or stolen, or checking for unusual activity on the card. Some credit card companies are even developing elaborate authentication services to fight fraudulent activity. Despite these efforts, however, more improvements are needed. What is needed, then, are methods, systems, and products that verify account transactions to reduce fraudulent activity.

SUMMARY

The problems noted above, along with other problems, may be reduced or eliminated by embodiments of the present invention using methods, systems, and products that verify account transactions. This invention assigns a verification character string to a user's account number. This verification character string may be different and/or in addition to a PIN or other verifying number associated with the account. The verification character string is then changed with each account transaction. The verification character string is thus an additional security measure to reduce fraudulent transactions. A thief would have to obtain the currently-assigned verification character string to make a fraudulent transaction. The verification character string would then change in preparation for a subsequent transaction. So, even if the currently-assigned verification character string is fraudulently obtained, only a single, fraudulent transaction could take place. As later paragraphs will explain, the present invention may also associate or "tie" the verification character string to a pre-approved or authorized transaction amount, thus preventing the thief from fraudulently charging more than the authorized amount. The present invention thus helps reduce fraudulent use of credit cards, debit cards, and other financial accounts.

According to aspects of the present invention, a method is disclosed for verifying account transactions. A transaction request is received that seeks to pre-approve a transaction for an account number. A verification character string is also received that is currently associated with the account number. If the transaction is pre-approved, then a new verification character string is assigned to the account number, such that the verification character string is changed with each transaction request.

According to another aspect of the present invention, a system is disclosed for verifying account transactions. The system comprises a verification application stored in memory, and a processor communicates with the memory and with the verification application. The system receives a transaction request to pre-approve a credit transaction for a credit card account number. The system also receives a verification character string that is currently associated with the credit card account number. If the transaction is pre-approved, then the system assigns a new verification character string to the credit card account number, such that the verification character string is changed with each transaction request.

In yet another aspect, a computer program product verifies account transactions. A transaction request is received that seeks to pre-approve a transaction for an account number. A verification character string is also received that is currently associated with the account number. If the transaction is pre-approved, then a new verification character string is assigned to the account number, such that the verification character string is changed with each transaction request.

Other aspects, including systems, methods, and/or computer program products according to the present invention will be or become apparent to one with ordinary skill in the art upon review of the following drawings and detailed description. Such additional aspects, including systems, methods, and/or computer program products, are included within the scope of the present invention.

BRIEF DESCRIPTION OF THE SEVERAL VIEWS OF THE DRAWINGS

The accompanying drawing figures incorporated in and forming a part of this specification illustrate several aspects, features, principles and advantages of the present invention, and together with the Detailed Description serve to better explain the aspects, features, principles, and advantages of the invention.

DETAILED DESCRIPTION

The present invention now will be described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will convey the invention to those skilled in the art.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
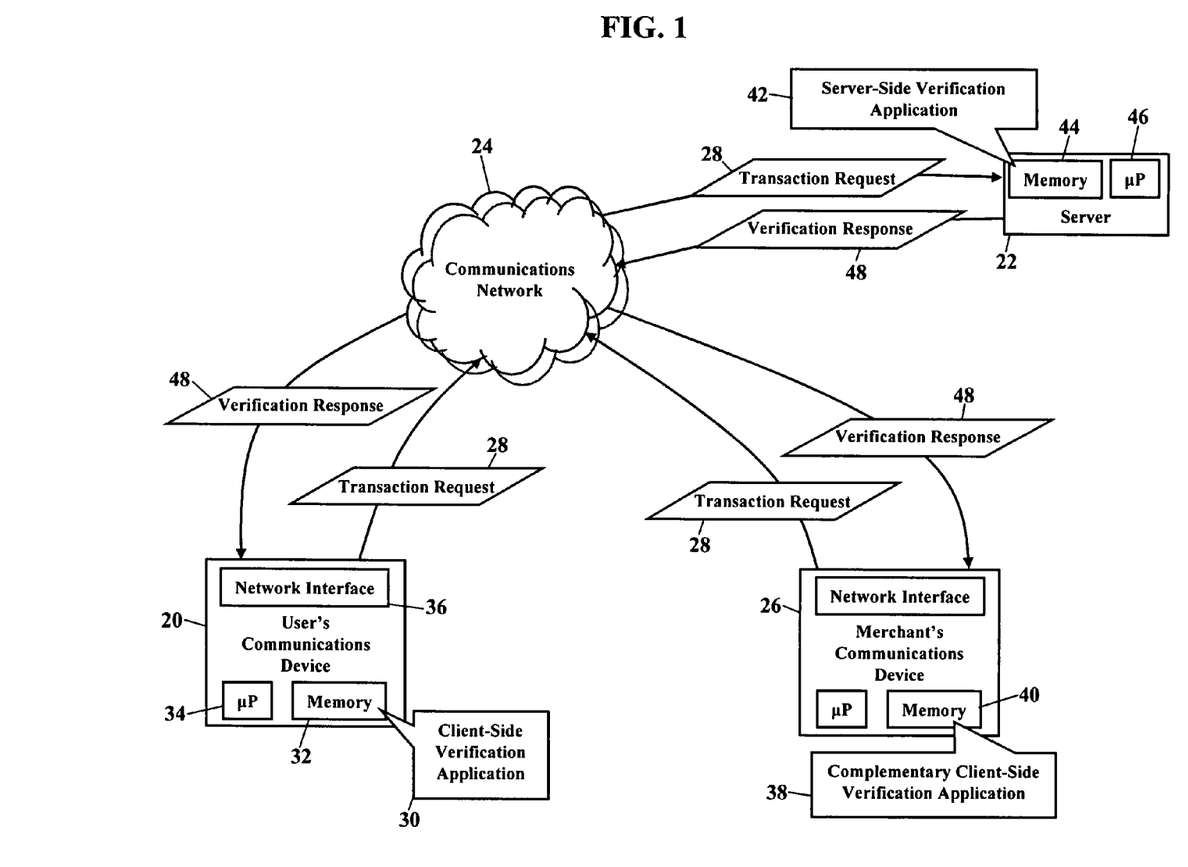
FIG. 1 is a simple schematic illustrating a network environment in which exemplary embodiments of the present invention may be implemented.

FIG. 1 is a simplified schematic illustrating a network environment in which exemplary embodiments of the present invention may be implemented. A user's communications device 20 communicates with a financial institution's server 22 via a communications network 24. A merchant's communications device 26 also communicates with the financial institution's server 22 via the communications network 24. Although the user's communications device 20 and the merchant's communications device 26 are generically shown, the communications devices 20 and 26, as will be later explained, may be any computer, analog/digital video recorder, kiosk, set top box, personal digital assistant, cordless/cellular/IP phone, or any other processor-controlled device. Whatever the communications devices 20 and 26, when either the user or the merchant desires to conduct a financial or other transaction with the financial institution, a transaction request 28 is sent. The user's communications device 20, for example, stores a client-side verification application 30 in memory 32. The client-side verification application 30 is a software engine that collaboratively verifies transaction requests with the server 22. The client-side verification application 30 includes processor-executable code or instructions that cause a processor ("µP") 34, application specific integrated circuit (ASIC), or other similar device to send the transaction request 28 to the server 22. The client-side verification application 30 instructs the processor 34 to invoke a network interface 36 to communicate the transaction request 28 via the communications network 24 to a communications or network address associated with the server 22. The merchant's communications device 26 may likewise store a complementary client-side verification application 38 in its memory 40, and the merchant's communications device 26 may similarly send the transaction request 28 via the communications network 24 to the financial institution's server 22.

The server 22 receives the transaction request 28. The server 22 stores a server-side verification application 42 in memory 44. The server-side verification application 42 is a software engine that helps verify or authorize transactions for financial, credit, or other accounts. The server-side verification application 42 includes processor-executable code or instructions that cause a server-side processor ("µP") 46, application specific integrated circuit (ASIC), or other similar device to receive and to process the transaction request 28. The server-side verification application 42 then causes the server-side processor 46 to send a verification response 48. The verification response 48 may include information that indicates whether the transaction request was approved or denied. The verification response 48 communicates via the communications network 24 to a communications address associated with the user's communications device 20 and/or the merchant's communications device 26.

FIG. 1 is only a simplified illustration of account verification. Some aspects of account verification or authorization are known, so this disclosure will not greatly explain the known details. If, however, the reader desires more details, the reader is invited to consult the following sources, all incorporated herein by reference in their entirety: U.S. Pat. No. 5,880,769 to Nemirofsky et al. (Mar. 9, 1999); U.S. Pat. No. 6,685,093 to Challa et al. (Feb. 3, 2004); U.S. Pat. No. 6,687,346 to Swartz et al. (Feb. 3, 2004); U.S. Pat. No. 6,736,322 to Gobburu et al. (May 18, 2004); U.S. Pat. No. 6,764,011 to Etani (Jul. 20, 2001); U.S. Pat. No. 6,854,651 to Smith et al. (Feb. 15, 2005); U.S. Pat. No. 6,969,002 to Creamer et al. (Nov. 29, 2005); Published U.S. Patent Application 2005/0109835 to Jacoby et al. (May 26, 2005); Published U.S. Patent Application 2005/0203765 to Meritzen et al. (Sep. 15, 2005); and Published U.S. Patent Application 2005/0247797 to Ramachandran (Nov. 10, 2005).

Moreover, the communications devices 20 and 26, and the server 22, are only simply illustrated. Because the architecture and operating principles of computers, communications devices, and other processor-controlled devices are well known, the hardware and software componentry of the communications devices 20 and 26 and the server 22 are not further shown and described. If, however, the reader desires more details, the reader is invited to consult the following sources, all incorporated herein by reference in their entirety: WILLIAM STALLINGS, COMPUTER ORGANIZATION AND ARCHITECTURE: DESIGNING FOR PERFORMANCE ($7^{th}$ Ed., 2005); and DAVID A. PATTERSON & JOHN L. HENNESSY, COMPUTER ORGANIZATION AND DESIGN: THE HARDWARE/SOFTWARE INTERFACE ($3^{rd}$. Edition 2004).

Figure 2:
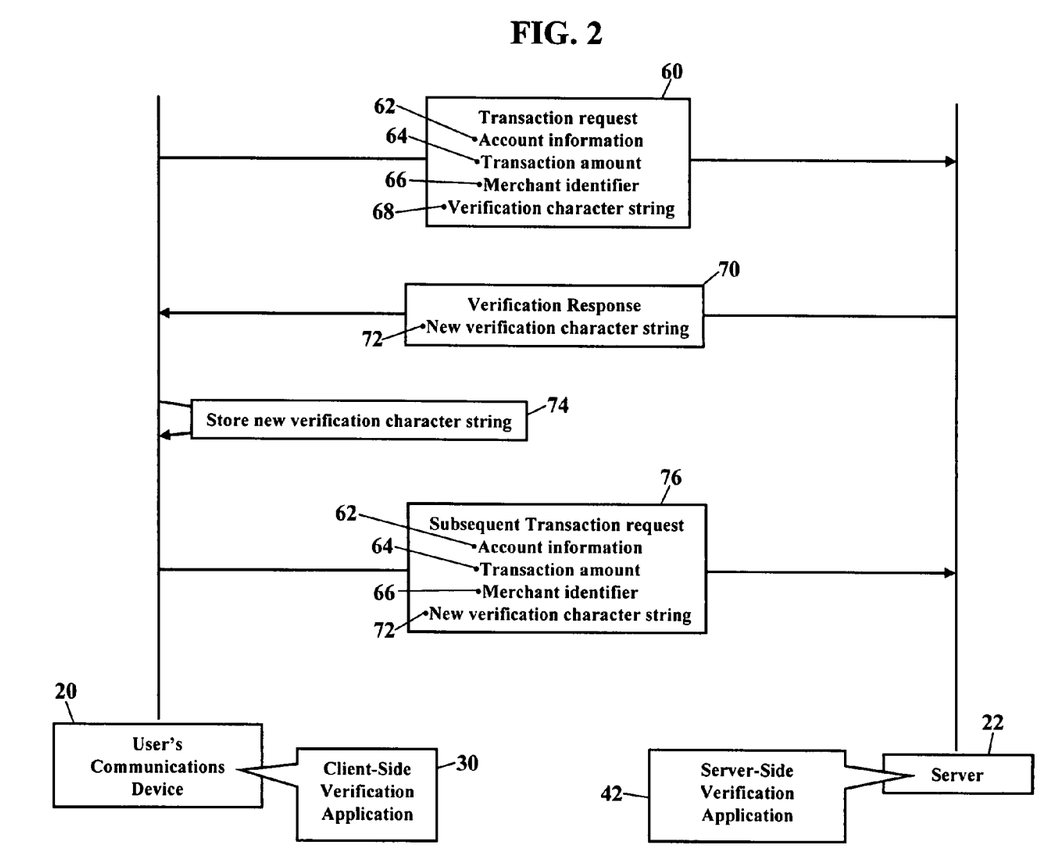
FIG. 2 is a more detailed schematic illustrating a two-party process for verifying account transactions, according to more aspects of the present invention.

FIG. 2 is a more detailed schematic illustrating a two-party process for verifying account transactions. Here the user's communications device 20 sends the transaction request 28 to the server 22 (Step 60). The transaction request 28 may include account information 62 and/or a transaction amount 64. The account information 62 identifies an account, such as an account number, credit card number, or other identifying information. The transaction request 28 may or may not include a merchant identifier 66. The transaction request 28 may also include a verification character string 68 that is associated with the account. The verification character string 68 may be any alpha-numeric string of characters that is used to verify and/or authenticate the account and/or the account holder. The verification character string 68 is an additional security measure to reduce fraudulent transactions. The verification character string 68 is an extra alpha-numeric string of characters in addition to the account number and to the user's personal identification number (or "PIN").

The server 22 receives the transaction request 28. The server-side verification application 42 may or may not evaluate the transaction request for approval. The server-side verification application 42, for example, may itself determine whether the user's requested transaction is approved. The server-side verification application 42, instead, may forward or "hand off" the transaction request to another engine or server for analysis. Regardless, the server 22 sends the verification response 48 to the originating user's communications device 20 (Step 70). The verification response 48 may indicate whether the transaction request was approved or denied. The purchaser-user may thus be informed of approved, or denied, transaction requests.

The verification response 48, however, includes a newly-assigned verification character string 72. Whether or not the transaction request 28 is approved or denied, the server-side verification application 42 may assign the new verification character string 72 to the account information 62. That is, each new transaction request results in a new assignment of the verification character string 72. The new verification character string 72 is assigned with each transaction request to further reduce or prevent fraud. Any time the user's communications device 20 communicates, transmits, and/or uses a currently assigned verification character string 68, the server-side verification application 42 then changes the verification character string for the next transaction. The server-side verification application 42 deletes, discards, or quits using the currently stored verification character string 68 and assigns the new verification character string 72. Although the new verification character string 72 may be determined by a simple or complex algorithm, the new verification character string 72 is preferably randomly assigned and associated with the account information 62.

The verification response 48 is received by the user's communications device 20. Whether or not the transaction request 28 was approved or denied, the client-side verification application 30 stores the new verification character string 72 in its memory 32 (Step 74). The client-side verification application 30 may or may not permanently delete the old, previously-assigned verification character string 68 from the memory 32. A subsequent or next transaction request must use the newly-assigned verification character string 72 (Step 76) or else the server-side verification application 42 may not verify/authenticate that subsequent transaction request.

Figure 3:
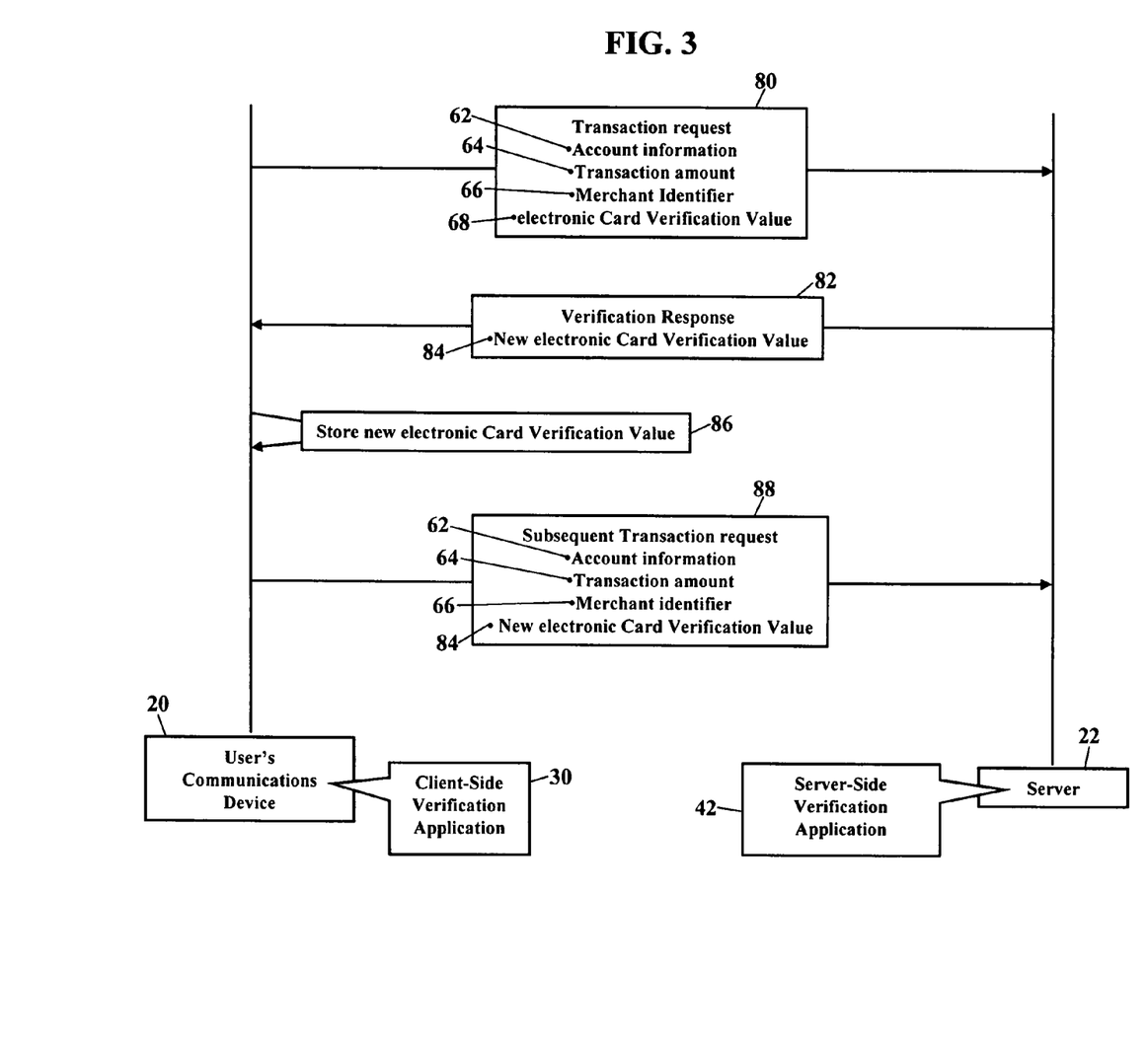
FIG. 3 is a schematic illustrating a two-party process for verifying credit card account transactions, according to additional aspects of the present invention.

FIG. 3 is a schematic illustrating a two-party process for verifying credit card account transactions. FIG. 3 is somewhat similar to FIG. 2, so the similar portions are only briefly discussed. The user's communications device 20 sends the transaction request 28 to the server 22 (Step 80). The server 22 may be operated by, or on behalf of, a financial institution. The transaction request 28 includes any of the account information 62, the transaction amount 64, the merchant identifier 66, and the verification character string 68 currently associated with the account. Here, however, the verification character string 68 is an electronic version of a Card Verification Value (or "CVV"). As those of ordinary skill in the art understand, the Card Verification Value is a number or code established by financial institutions (such as credit card issuers or companies) to reduce fraud in electronic transactions. A Card Verification Value procedure may require the CVV number to verify that the user is in actual possession of the credit card. The Card Verification Value code is a security feature for electronic "card not present" transactions. The Card Verification Value code is a three or more digit code that provides a cryptographic check of information embossed on a credit or debit card. The Card Verification Value code is not usually a component or part of the credit card number, the account number, or the user's PIN. The Card Verification Value code may also be known by other names or acronyms, such as "CVV2" (VISAS), "CVC2" (MASTERCARD®), or "CID" (AMERICAN EXPRESS®). Because the Card Verification Value is already known in the art, the known aspects are not further discussed.

The server 22 receives the transaction request 28. Once the transaction is approved or denied, the server 22 returns the verification response (Step 82). The verification response may or may not indicate whether the transaction request was approved or denied. Here, however, the verification response includes a new electronic Card Verification Value 84. The server-side verification application 42 may discard or delete the old Card Verification Value 68 associated with the user's credit card account and, instead, assign the new Card Verification Value 84 to the account information 62. The new Card Verification Value 84 is preferably assigned with each use to reduce or prevent fraud. The server-side verification application 42, however, may only periodically or randomly change Card Verification Values.

The verification response 48 is received by the user's communications device 20. The client-side verification application 30 stores the new Card Verification Value 84 in memory (Step 86). The next transaction request must use the newly-assigned Card Verification Value 84 or risk denial (Step 88).

Figure 4:
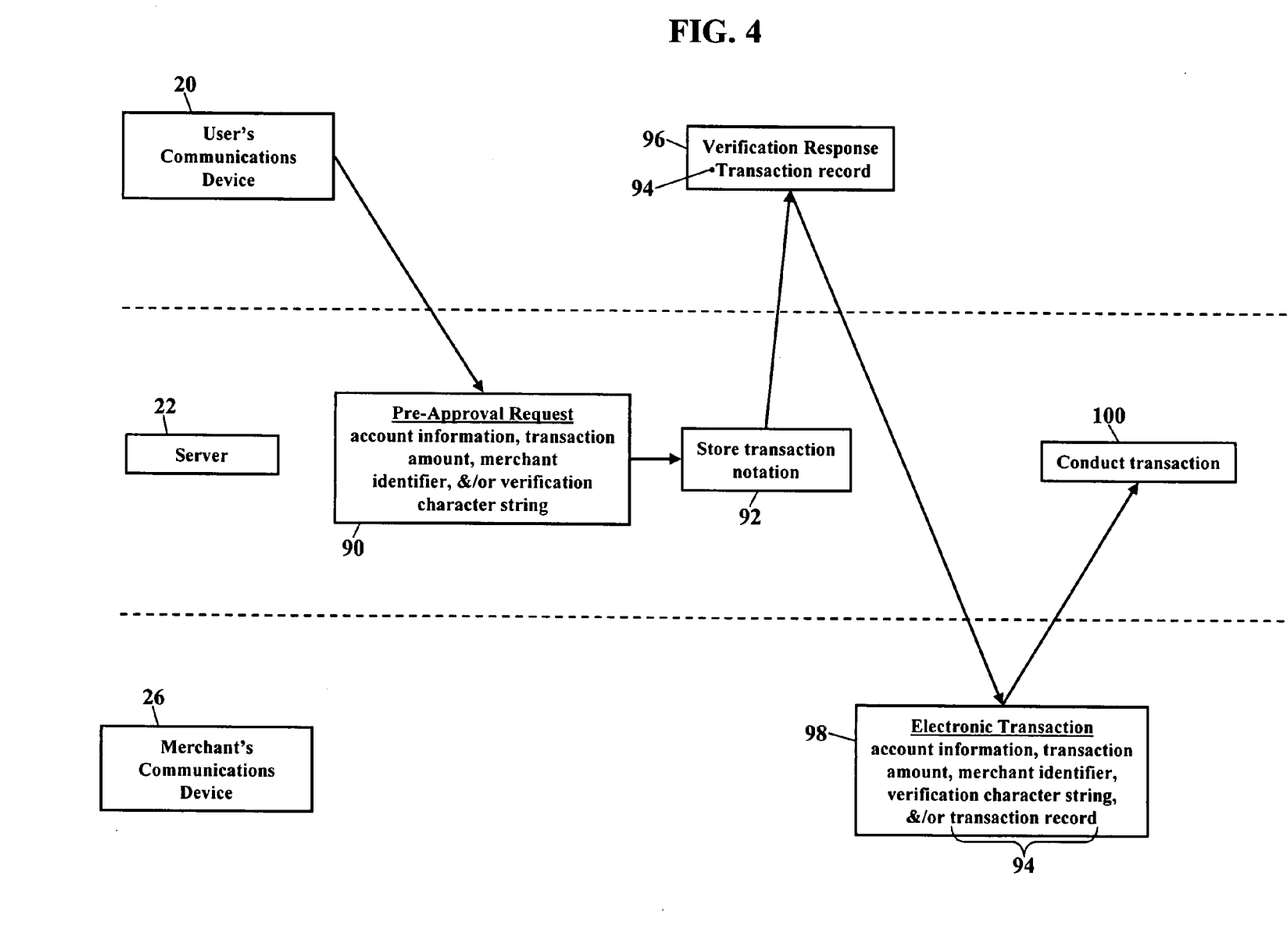
FIGS. 4 and 5 are schematics illustrating a pre-approval process for account transactions, according to still more aspects of the present invention.
Figure 5:
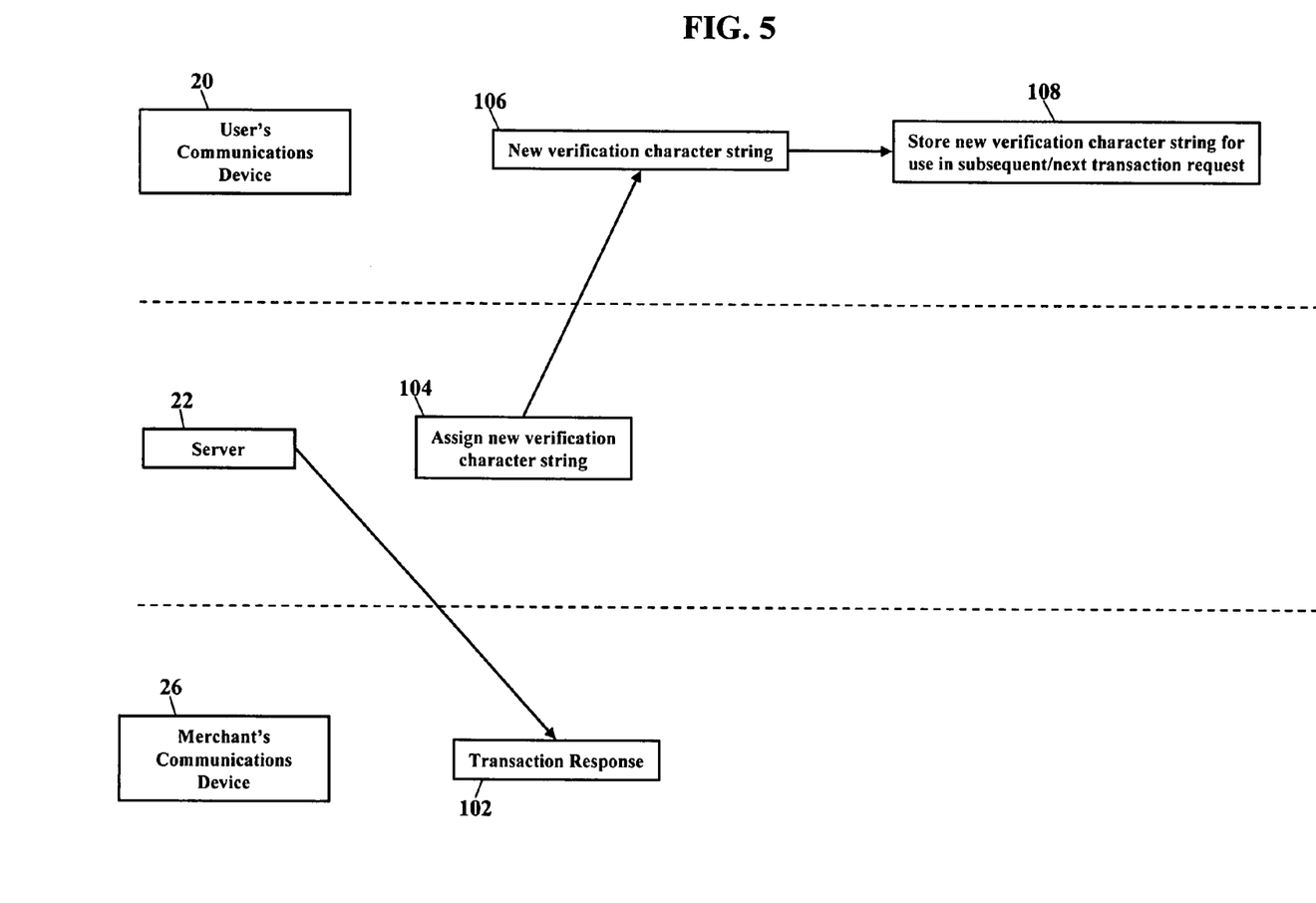

FIGS. 4 and 5 are schematics illustrating a pre-approval process for account transactions. Here the user first desires to obtain pre-approval before purchasing a good or service from the merchant. Suppose, for example, the user wants to know whether their financial institution will pre-approve a credit card transaction. If the transaction is pre-approved, the user may confidently approach the merchant's associate for checkout and for purchase of goods or services. If the transaction has been pre-approved, the user avoids the embarrassing situation of a credit card transaction denial. When the user seeks pre-approval, the user's communications device 20 sends a pre-approval request to the financial institution's server 22 (Step 90). The pre-approval request may again include any of the account information, the transaction amount, the merchant identifier, and the verification character string currently associated with the account. The pre-approval request may also include some flag, feature, or other information that identifies or marks the request for pre-approval. That is, the pre-approval request is distinguished from an actual transaction request (such as the transaction request 28 shown or described in FIGS. 1-3). For example, because the pre-approval request originates from the user's communications device 20, as opposed to the merchant's communications device 26, the pre-approval request may be interpreted as a request for pre-approval of the transaction amount.

The financial institution's server 22 receives the pre-approval request. The server-side verification application 42 may, or may not, participate in the pre-approval evaluation. Regardless of participation, the server-side verification application 42 may store a transaction notation in the memory (Step 92). The transaction notation at least indicates that a future transaction is expected for the user's account information, for the pre-approved transaction amount, and with the associated verification character string. The transaction notation may even identify the merchant (such as by the merchant identifier 66). The transaction notation, of course, may also describe a denied request to pre-approve the transaction amount. The financial institution's server 22 then constructs the verification response. The verification response may (or may not) indicate whether an actual transaction for the transaction amount will be approved. If the transaction has been pre-approved, the user avoids an embarrassing denial. If the transaction has been pre-approved, the verification response may also include a transaction record 94. This transaction record 94 may be required or used for the actual transaction for the transaction amount. The transaction record 94 is preferably a unique number that the merchant may use to identify the actual transaction for the pre-approved transaction amount. The financial institution's server 22 then sends the verification response (Step 96).

The user's communications device 20 receives the verification response. If the user was pre-approved, the user may now confidently proceed to the merchant's checkout, whether in a physical store or at an online e-commerce website. At checkout the user's communications device 20 interacts with the merchant's communications device 26 to conduct an electronic transaction (Step 98). The user's communications device 20 may communicate at least one of the account information, the transaction amount, and the verification character string currently associated with the account. Here, however, the user's communications device 20 may additionally or alternatively communicate the transaction record 94. Because the user was pre-approved, and because the transaction record 94 uniquely identifies the pre-approved transaction amount, the merchant may only require the transaction record 94. (The desired level of security will determine what information is required to process the pre-approved transaction.) The transaction record 94, for example, may be communicated via any medium or form, such as a verbal, written, visual, or electronic communication. The user's communications device 20, for example, may convert the transaction record 94 to a purchase-specific bar code for presentation on a display device. That is, the bar code may only be used for the pre-approved transaction amount with the merchant. The merchant's communications device 26 may then optically scan the bar code to obtain the transaction record 94. The user's communications device 20 may likewise convert the account information, the transaction amount, and/or the verification character string to one or more purchase-specific bar codes for presentation and optical scanning. Whatever information is needed to complete the actual transaction is communicated between the user's communications device 20 and the merchant's communications device 26.

The merchant's communications device 26 then conducts a transaction with the financial institution's server 22 (Step 100). The merchant typically seeks payment from the financial institution for the transaction amount. Depending on the level of security, the merchant's communications device 26 may communicate any of the account information, the transaction amount, the verification character string, and/or the transaction record 94 to the financial institution's server 22. The financial institution's server 22 may process the transaction, or the information may be forwarded to another server destination for processing.

The process continues with FIG. 5. The financial institution's server 22 then sends a transaction response (Step 102). Now, however, the new verification character string is assigned (Step 104). Because an account transaction has been requested and/or processed, the server-side verification application 42, operating in the server 22, assigns the new verification character string to the user's account information. The financial institution's server 22, for example, may assign and associate the new electronic Card Verification Value to the user's account information. The new verification character string is then communicated to the user's communications device 20 (Step 106). The client-side verification application stores the new verification character string in memory for use in a subsequent or next transaction request (Step 108).

The pre-approval process illustrated in FIGS. 4 and 5 provides security advantages. As the above paragraphs explained, each new verification character string helps thwart unauthorized charges to the user's account. Because the verification character string changes with each account transaction, the present invention makes fraudulent use more difficult. Moreover, because the transaction amount was pre-approved, an actual transaction may only represent that pre-approved amount. Remember, in FIG. 4 the user pre-approves the transaction amount to avoid an embarrassing denial. If a thief tries to fraudulently make a transaction for some other amount, the financial institution's server 22 (e.g., the server-side verification application 42) would notice a discrepancy in the transaction record 94. The server-side verification application 42 may be configured to immediately deny/terminate the transaction or to implement additional verification procedures (as discussed below). Additionally, the merchant identifier may be used to further reduce fraudulent use. If the user pre-approves a transaction amount with a particular merchant (using the merchant identifier), the actual transaction must be with that merchant. So, not only must the actual transaction represent the pre-approved amount, but the actual transaction must also involve the pre-approved merchant. Even if the user's credit card account information is fraudulently obtained, a thief could only make a single charge for a pre-approved amount with a known merchant before the verification character string (e.g., the electronic card verification value code) is changed.

When the user wishes to pre-approve a transaction, a purchase total may be provided. The pre-approval process illustrated in FIGS. 4 and 5 allows the user to pre-approve a transaction amount. If the user wishes to purchase multiple items or services, the user may wish to pre-approve the total transaction amount for all item or services. The user, for example, may use the user's communications device 20 to scan the price for each item. The user's communications device 20 could also tally or total the transaction amount for all the items. The user could also use a merchant-provided handheld scanner to tally the items, and the total transaction amount for pre-approval is then communicated from the handheld scanner to the user's communications device 20. However the total transaction amount is obtained, the user may pre-approve the total transaction amount, rather than each individual item.

Because the transaction amount has been pre-approved, the user should be able to remove items. As the user adds items, inevitably the total transaction amount may exceed the pre-approved amount. The user, then, may remove or delete items to avoid an embarrassing denial. The merchant-provided handheld scanner, or the user's communications device 20, may provide a list of items that have been selected for purchase. The user may view the total transaction amount for all the items on this list. The user is also informed of a remaining pre-approved balance or over charges. If the transaction amount exceeds the pre-approved amount, the user may remove items to avoid denial at checkout.

This pre-approval process may also aid check-out. When the user is ready for check out at the merchant's physical location, the user approaches the merchant's point-of-sale terminal. The user places the desired items on a scale and electronically transfers a listing of the items to the point-of-sale terminal. The point-of-sale terminal may include a scale that adds or tallies the weights of the items purchased. This weight tally is then compared to a calculated weight for the listing of items. If the calculated weight favorably compares to the actual weight, then the purchase may be approved and verified.

The pre-approved transaction amount may be a maximum value. The user may find it tedious to pre-approve one or more individual purchases. The user, then, may pre-approve a maximum transaction amount. As long as the user's purchases do not exceed the maximum transaction amount, the user need not worry about denials. Likewise, the user may also pre-approve cumulative transaction amounts. The user may pre-approve a cumulative transaction amount when shopping at an online mall or physical mall. As the user makes multiple purchases, the cumulative total for those purchases is compared to the pre-approve transaction amount. The user may even establish hourly, daily, and/or weekly cumulative transaction amounts to control spending habits. The user may also establish maximum transaction amounts by store or merchant. A parent, for example, may establish a preset maximum amount for a child to spend at a given store on a given day.

Figure 6:
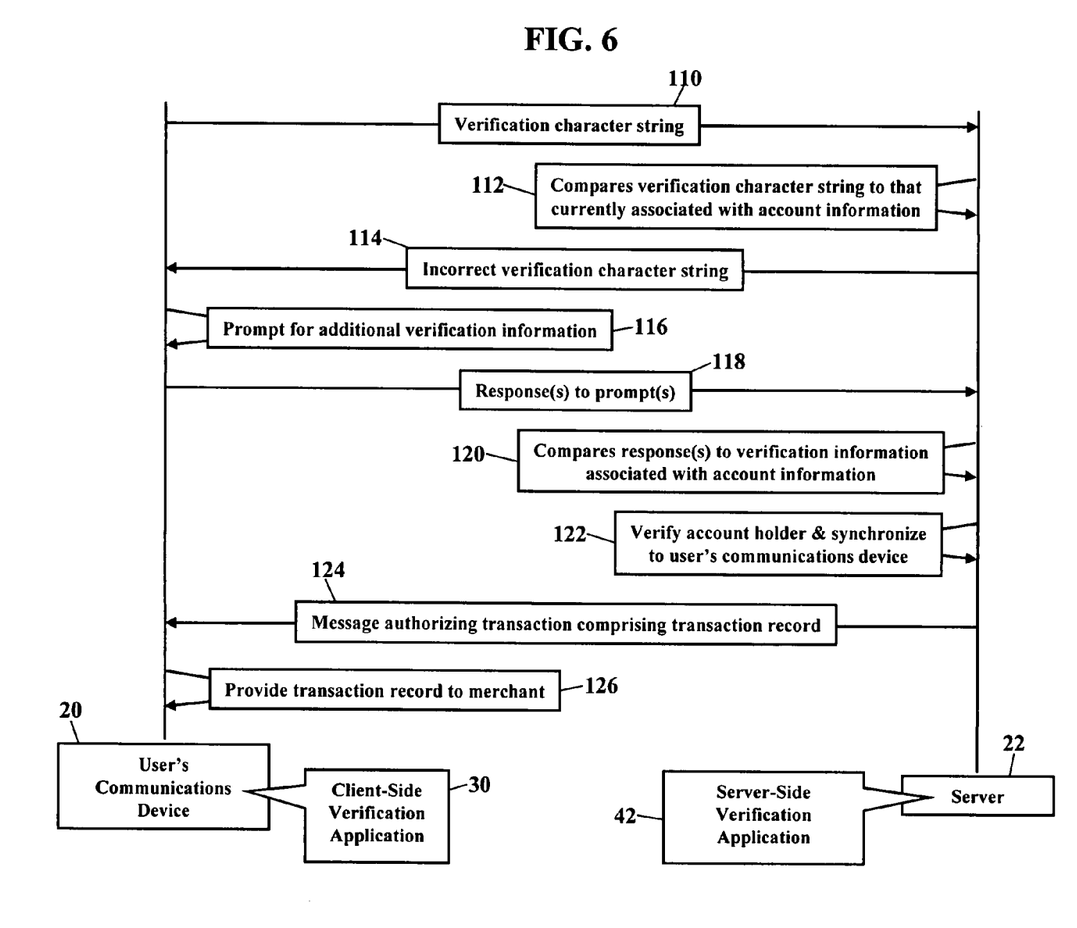
FIG. 6 is a schematic illustrating a single-tiered process for authorizing an account transaction, according to more exemplary embodiments of the present invention.

FIG. 6 is a schematic illustrating a single-tiered process for authorizing an account transaction, according to more exemplary embodiments of the present invention. Inevitably there will be instances when the verification character string required by the financial institution's server 22 will not match that transmitted from the user's communications device 20. A miscommunication, malfunction, human error, and many other situations may cause a discrepancy in the verification character strings. For many reasons not pertinent to this disclosure, the verification character string stored/required by financial institution's server 22 may not match the verification character string stored/used by the user's communications device 20. In these instances, then, procedures may be implemented to resynchronize the verification character strings. Should the server-side verification application 42 (operating in the financial institution's server 22) receive a verification character string that is not identical to that currently associated with the user's account information 62, then the server-side verification application 42 may be configured to implement additional verification procedures to verify an identity of an account holder. That is, the server-side verification application 42 may prompt the user to further verify their identity. If the user's responses are verified, then the user may be authenticated, despite an incorrect verification character string.

FIG. 6, then, illustrates additional verification procedures. The user's communications device 20 sends the verification character string to the server 22 (Step 110). When the server 22 receives the verification character string, the server-side verification application 42 compares the verification character string to that currently associated with the user's account information (Step 112). When a discrepancy is found, the server 22 sends a message to the user's communications device 20 (Step 114). The message may explain that the verification character string is incorrect. This same message (or additional messages) cause the user's communications device 20 to visually/audibly prompt for additional verification information (Step 116). The user, for example, may be prompted to input/enter a PIN, a ZIP code, a social security number, or any other information that helps uniquely identify the user. A user interface receives responses to the prompt(s), and the user's communications device 20 sends those responses to the server 22 (Step 118). The responses may be optionally encrypted for security reasons. When the server 22 receives those responses, the server-side verification application 42 compares the responses to verification information associated with the account information or number (Step 120). If the responses are correct, the user is verified as the account holder and the server-side verification application 42 synchronizes to the user's communications device 20, thus accepting the verification character string (sent from the user's communications device 20), despite the discrepancy (Step 122). The server 22 sends a message authorizing the account transaction, and the message may include the transaction record (Step 124). The user's communications device 20 then provides the transaction record to the merchant for payment processing (Step 126). The user's communications device 20, for example, may convert the transaction record to a purchase-specific bar code for optical scanning by the merchant. The merchant and the server 22 then process the account transaction, as earlier described.

A two-tiered verification process may be used. In this two-tiered process the user is always prompted for additional verification information (such as Step 116), even if the verification character string is correct. That is, even if the user's communications device 20 sends the correct verification character string to the server 22, the user is still prompted to input/enter a PIN, social security number, or other information. In this two-tiered process, the verification character string must be correct, and the user's additional verification information must be correct. If either step/response fails, then the server-side verification application 42 may not grant authorization and/or deny a transaction request or a pre-approval request. The single-tiered process of FIG. 6, however, may permit use/authorization if either form of verification succeeds. In the single-tier process, then, a denial may only occur when both the verification character string and the additional verification information are incorrect.

The transaction amount 64 may also be used to provide added security. When the user attempts to pre-approve or authorize an account transaction, the user's communications device 20 may prompt the user to input the requested transaction amount (e.g., a credit card charge amount). The transaction amount 64, for example, may be used to generate a more complex and secure purchase-specific bar code. The purchase-specific bar code not only relates the account number and the verification character string, but the purchase-specific bar code may also specify the authorized transaction amount 64. Again, even if a thief obtains the account information 62 and the currently-assigned verification character string 68, the thief may only fraudulently charge the transaction amount 64. The present invention would then change the verification character string 68 for the next transaction, thus helping thwart additional fraudulent transactions.

The transaction amount 64, then, may be used to enhance the single-tiered verification process. In the single-tier example (illustrated in FIG. 6), the user inputs the requested transaction amount. The user's communications device 20 sends the requested transaction amount and the verification character string to the server 22. If the verification character string is correct, the server-side verification application 42 authorizes the transaction amount 64. The server 22 sends the message authorizing the account transaction, and the message may include an enhanced transaction record 94. The user's communications device 20 then provides the enhanced transaction record 94 to the merchant, and the enhanced transaction record 94 may include the user's requested transaction amount. The user's communications device 20, for example, may display an enhanced purchase-specific bar code for scanning at the point-of-sale. If the merchant's communications device (e.g., point of sale terminal) is properly configured/equipped to receive the enhanced purchase-specific bar code, then the purchase may be immediately authorized. If the merchant is not capable of receiving or processing the enhanced purchase-specific bar code, the merchant reverts to known authorization procedures to process the transaction amount. In this case the financial institution's server 22 may recognize that the transaction amount has already been authorized and so immediately sends an approval. The financial institution's server 22 then changes the verification character string 68 for the next transaction, thus helping to thwart fraudulent transactions.

The transaction amount 64 may also be used to enhance the two-tiered verification process. The user's communications device 20 again sends the requested transaction amount 64 and the verification character string 68 to the server 22. If the verification character string 68 is incorrect, the user is prompted to input/enter a PIN, social security number, or other information. If the responses are correct, the user is verified as the account holder and the server-side verification application 42 synchronizes to the user's communications device 20. The server 22 sends the message authorizing the account transaction, and the user's communications device 20 then provides the enhanced transaction record to the merchant. The user's communications device 20, again, may display the enhanced purchase-specific bar code for scanning at the point-of-sale terminal, as above explained. The financial institution's server 22 then changes the verification character string for the next transaction, thus again thwarting future fraudulent transactions.

The server-side verification application 42 may also tabulate the user's available credit. As the user makes charges to their credit card, for example, the server-side verification application 42 may track the user's available credit. Because credit accounts usually have a maximum accumulated balance, many users may wish to know their available credit. The server-side verification application 42, for example, may query one or more databases that store balance information and available credit information. As each transaction amount is authorized, the database/databases is/are updated to reflect the user's balance and available credit. The server-side verification application 42, then, may communicate this information to the user, thus keeping the user updated to their balance and available credit. If the user has multiple credit card accounts, the server-side verification application 42 could provide balance and available credit information for each account.

Figure 7:
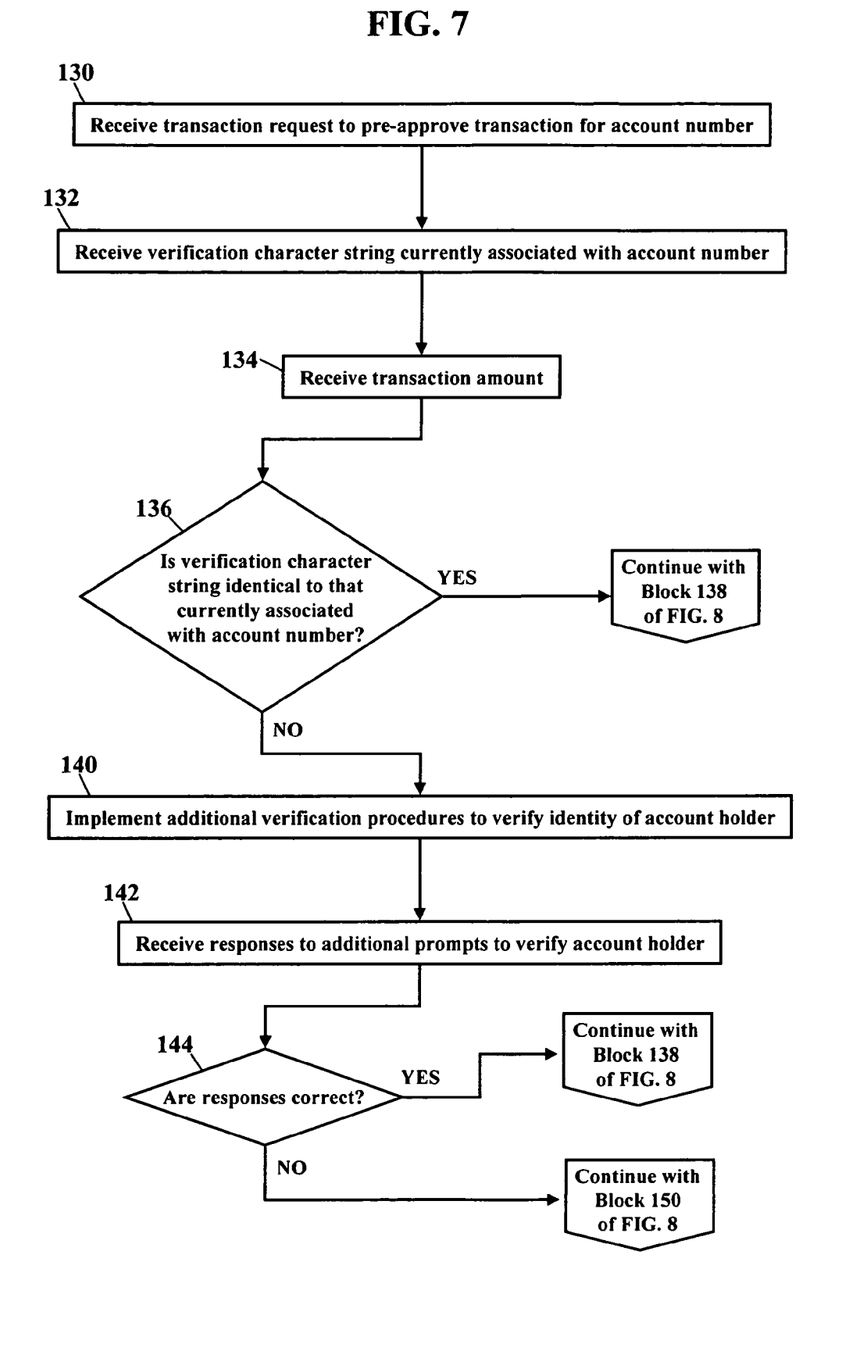
FIGS. 7 and 8 are flowcharts illustrating a method of verifying account transactions, according to still more aspects of the present invention.
Figure 8:
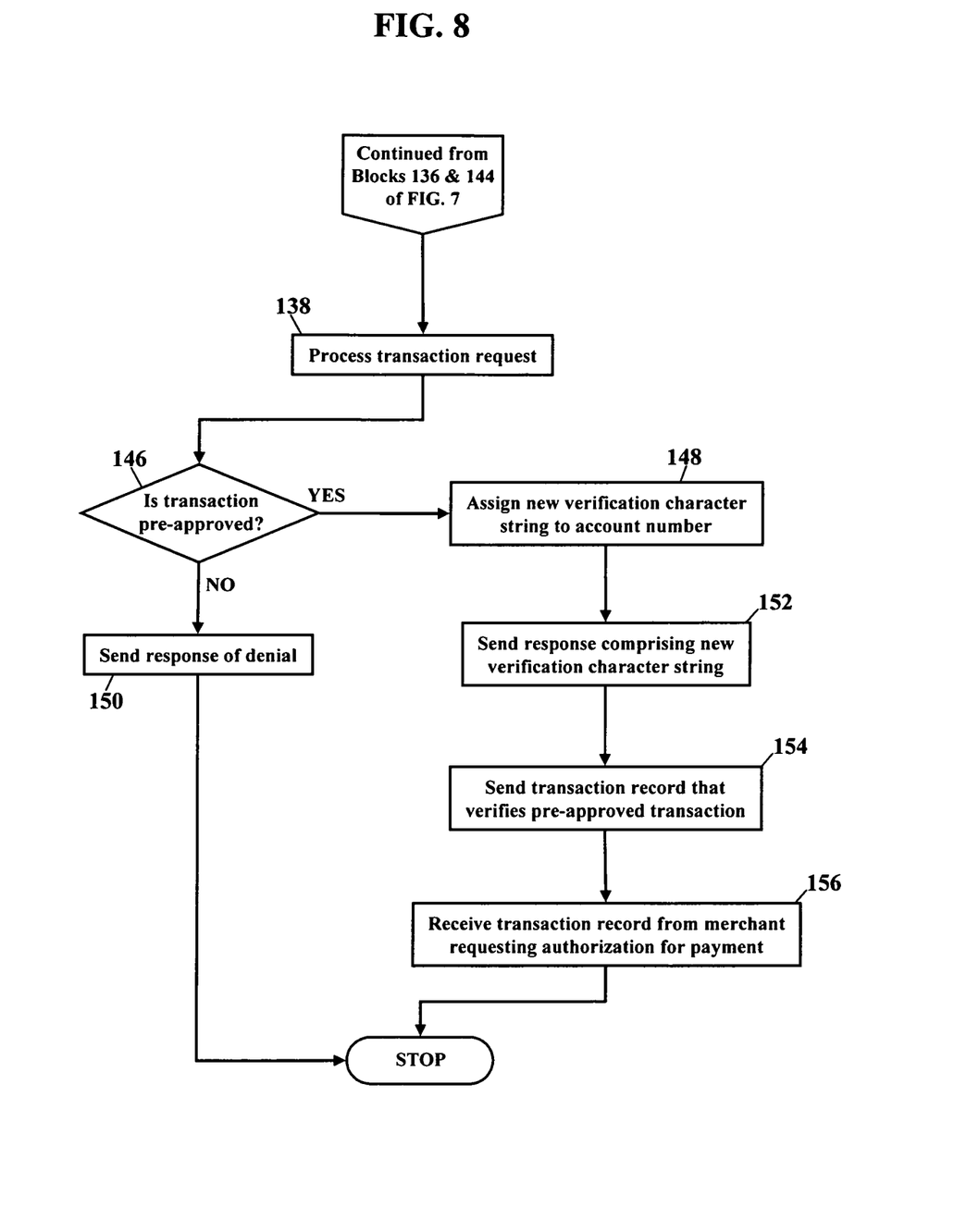

FIGS. 7 and 8 are flowcharts illustrating a method of verifying account transactions. A transaction request is received to pre-approve a transaction for an account number (Block 130). A verification character string is received that is currently associated with the account number (Block 132). A transaction amount may also be received (Block 134). If the received verification character string is identical to that currently associated with the account number (Block 136), then the transaction request is processed (see Block 138 of FIG. 8). If, however, the received verification character string is incorrect (Block 136), then additional verification procedures are implemented to verify an identity of an account holder (Block 140). Responses to additional prompts are received to verify an identity of the account holder associated with the account number (Block 142). Those responses are then checked/compared for correctness (Block 144).

The flowchart continues with FIG. 8. If the responses are correct (Block 144 of FIG. 7), then the transaction request is processed (Block 138). If the transaction is pre-approved (Block 146), then a new verification character string is assigned to the account number (Block 148). The verification character string is thus changed with each transaction request. If, however, the transaction is not approved (Block 146), then a denial response is sent (Block 150). A response may be sent comprising the new verification character string (Block 152). A transaction record may also be sent that verifies the pre-approved transaction (Block 154). The transaction record may then be received from a merchant requesting authorization for payment (Block 156).

The verification character string, however, may also change upon denials. In FIG. 8, If the transaction is pre-approved (Block 146), then the new verification character string is assigned (Block 148). For added security, the verification character string may also change even if the transaction is denied. Here, then, any transaction request and/or authorization request may result in a change to the verification character string. The new verification character string may be used to indicate that a pre-approval request was transmitted, completed, received, and/or approved. If the final transaction amount is a match, the new verification character string may be used to quicken the final approval. If a pre-approval was denied, however, the verification character string may change as it would for a purchase denial.

Figure 9:
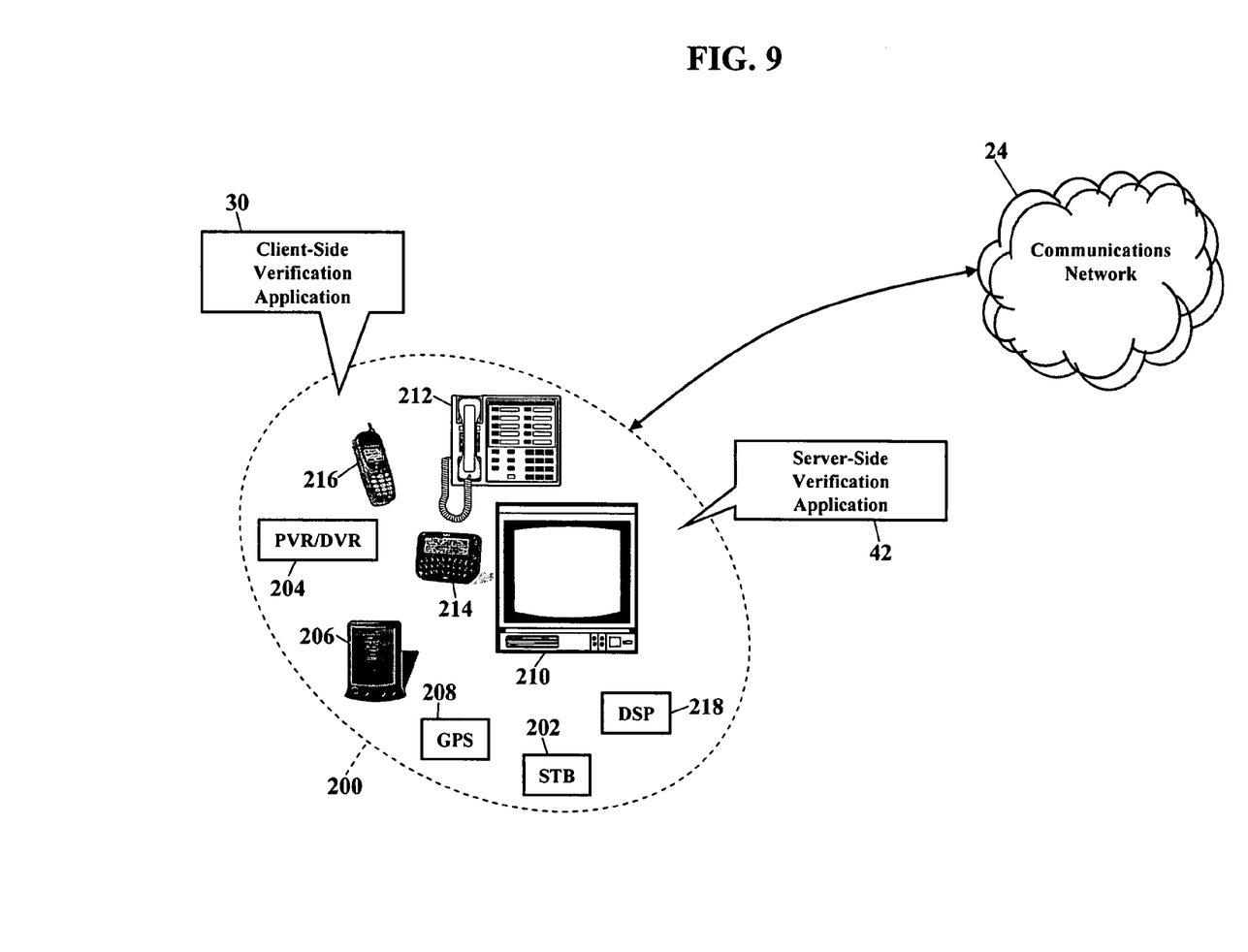
FIG. 9 depicts other possible operating environments for additional aspects of the present invention.

FIG. 9 depicts other possible operating environments for additional aspects of the present invention. FIG. 9 illustrates that the client-side verification application 30 and/or the server-side verification application 42 may alternatively or additionally operate within various other communications devices 200. FIG. 9, for example, illustrates that the client-side verification application 30 and/or the server-side verification application 42 may entirely or partially operate within a set-top box (202), a personal/digital video recorder (PVR/DVR) 204, personal digital assistant (PDA) 206, a Global Positioning System (GPS) device 208, an interactive television 210, an Internet Protocol (IP) phone 212, a pager 214, a cellular/satellite phone 216, or any computer system and/or communications device utilizing a digital signal processor (DSP) 218. The communications device 350 may also include watches, radios, vehicle electronics, clocks, printers, gateways, and other apparatuses and systems. Because the architecture and operating principles of the various communications devices 200 are well known, the hardware and software componentry of the various communications devices 200 are not further shown and described. If, however, the reader desires more details, the reader is invited to consult the following sources, all incorporated herein by reference in their entirety: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module—ME) interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, ITV HANDBOOK: TECHNOLOGIES AND STANDARDS (2004).

The client-side verification application 30 and/or the server-side verification application 42 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the exemplary embodiments, allow the present invention to be easily disseminated. A computer program product comprises the client-side verification application 30 and/or the server-side verification application 42 stored on the computer-readable medium. The client-side verification application 30 and/or the server-side verification application 42 comprises computer-readable instructions/code for verifying account transactions, as hereinabove explained. The client-side verification application 30 and/or the server-side verification application 42 may also be physically embodied on or in any addressable (e.g., HTTP, I.E.E.E. 802, Wireless Application Protocol (WAP), or BLUETOOTH®) wireless device capable of presenting an IP address.

While the present invention has been described with respect to various aspects, features, principles, and exemplary embodiments, those skilled and unskilled in the art will recognize the present invention is not so limited. Other aspects, variations, modifications, and alternative embodiments may be made without departing from the spirit and scope of the present invention and are considered within the scope of the concepts disclosed herein and the invention as described by the claims.

What is claimed is:

1. A processor-implemented method of verifying account transactions, comprising:
   receiving a transaction request to pre-approve a transaction for an account number;
   receiving a verification character string that is currently associated with the account number;
   pre-approving the transaction;
   assigning a new verification character string to the account number such that the verification character string is changed with each transaction request and sending a response comprising both the new verification character string and a transaction record identifying a transaction associated with the pre-approved transaction when the transaction is pre-approved.

2. A method according to claim 1, wherein the step of receiving the transaction request comprises receiving a transaction amount to pre-approve.

3. A method according to claim 1, wherein the transaction record verifies the pre-approved transaction.

4. A method according to claim 3, further comprising the step of receiving the transaction record from a merchant requesting authorization for payment.

5. A method according to claim 1, wherein if the received verification character string is not identical to that currently associated with the account number, then implementing additional verification procedures to verify an identity of an account holder.

6. A method according to claim 1, further comprising the step of receiving responses to additional prompts to verify an identity of an account holder associated with the account number.

7. A method according to claim 1, the method further comprising:
   if the transaction is not pre-approved, then assigning a different verification character string to the account number and sending a response comprising the different verification character string.

8. A computer program product according to claim 1, further comprising instructions for, if the transaction is not pre-approved, then assigning a different verification character string to the account number and sending a response comprising the different verification character string.

9. A system, comprising:
   a verification application stored in memory; and
   a processor communicating with the memory and with the verification application,
   the system receiving a transaction request to pre-approve a credit transaction for a credit card account number, the system also receiving an electronic verification value that is currently associated with the credit card account number, the system pre-approving the credit transaction, the system assigning a new electronic verification value to the credit card account number such that the electronic verification value is changed with each transaction request and sending a response comprising both the new electronic verification value and a transaction record identifying a transaction associated with the pre-approved transaction when the credit transaction is pre-approved.

10. A system according to claim 9, wherein the processor receives a transaction amount to pre-approve.

11. A system according to claim 9, wherein the transaction record verifies the pre-approved credit transaction.

12. A system according to claim 11, wherein the system receives the transaction record from a merchant requesting authorization for payment.

13. A system according to claim 9, wherein if the received electronic verification value is not identical to that currently associated with the credit card account number, then the processor implements additional verification procedures to verify an identity of an account holder.

14. A system according to claim 9, wherein the system receives responses to additional prompts to verify an identity of an account holder associated with the credit card account number.

15. A system according to claim 9, wherein, if the credit transaction is not pre-approved, then the system assigns a different electronic verification value to the credit card account number and sends a response comprising the different electronic verification value.

16. A computer program product comprising a computer-readable medium storing instructions for causing a processor to perform the following steps:
   receiving a transaction request to pre-approve a transaction for an account number;
   receiving a verification character string that is currently associated with the account number;
   pre-approving the transaction;
   assigning a new verification character string to the account number such that the verification character string is changed with each transaction request and sending a response comprising both the new verification character string and a transaction record identifying a transaction associated with the pre-approved transaction when the transaction is pre-approved.

17. A computer program product according to claim 16, further comprising instructions for receiving a transaction amount to pre-approve.

18. A computer program product according to claim 16, wherein the transaction record verifies the pre-approved transaction.

19. A computer program product according to claim 18, further comprising instructions for receiving the transaction record from a merchant requesting authorization for payment.

20. A computer program product according to claim 16, wherein if the received verification character string is not identical to the verification character string currently associated with the account number, then further comprising instructions for implementing additional verification procedures to verify an identity of an account holder.

* * * * *